Figure 1:
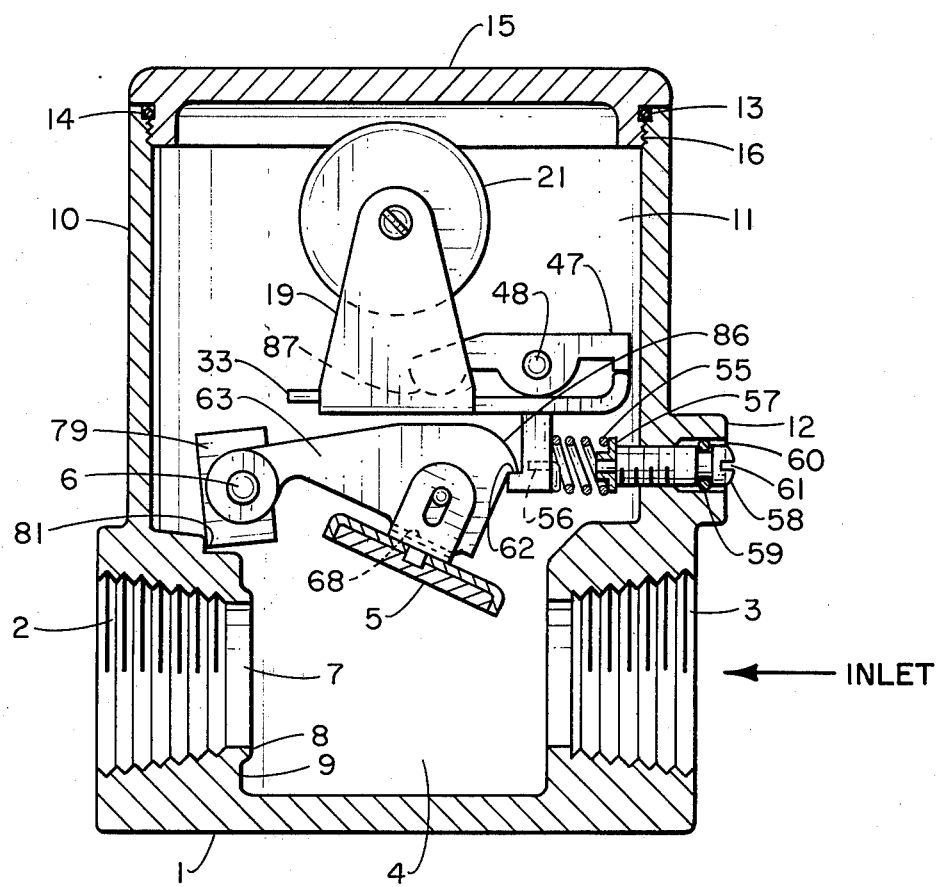

United States Patent [19]

Speck

[11] 3,965,917

[45] June 29, 1976

[54] EARTHQUAKE VALVE

[76] Inventor: Ronald M. Speck, 8015 McGroarty St., Sunland, Calif. 91040

[22] Filed: Mar. 14, 1974

[21] Appl. No.: 450,982

[52] U.S. Cl. ............................................. 137/38
[51] Int. Cl.² ...................................... F16K 17/36
[58] Field of Search ............................. 137/38, 39; 200/61.45 R, 61.48, 61.49, 61.50, 61.51, 61.53

[56] References Cited
UNITED STATES PATENTS

| | | | |
|---|---|---|---|
| 2,206,067 | 7/1940 | Waltamath | 200/61.45 R |
| 3,489,160 | 1/1970 | Moore | 137/39 |

Primary Examiner—Robert G. Nilson
Attorney, Agent, or Firm—Jack C. Munro

[57] ABSTRACT

An acceleration responsive device usable as a shut-off valve for a fluid conduit having a pair of reactant masses which are loosely interlocked together, the masses mounted within a housing. Upon the housing receiving a shock force of predetermined magnitude, the masses are caused to move from an in-line interlocked position to a misaligned interlocked position. The masses are connected to a latching means which when in the misaligned position is activated to move an actuation means to close the fluid conduit.

12 Claims, 4 Drawing Figures

EARTHQUAKE VALVE

The present invention relates to an actuator and valve composite where the valve is caused to be closed by the actuator when the actuator is subjected to acceleration like produced during an earthquake. This invention is limited to the actuator as the actuating component as described below, but this invention is not limited to a valve as the actuated component.

Briefly, the actuator and valve composite disclosed herein involves an actuator what may be termed an inertia mechanism, basically composed of two separate masses preferably of high weight per volume, like lead or like, the two masses being butted up against each other at a circumference of predetermined geometry and held together by means of a pair of arms in a manner that said arms allow each of said masses to swivel around the point where said masses are supported by said arms, each of said arms being pivoted around an axis parallel to the axis of pivot of the other arm and both arms being of such geometry that any movement of any of the two masses or, any movement of both masses with reference to the encasement and away from their steady state position will produce a predetermined unidirectional motion at a certain point of at least one of said arms. This unidirectional motion is monitored by a secondary arm, said secondary arm in turn releases in this case the spring biased seat disc mechanism of the valve, thus causing the closure of said valve. Using this arrangement, any acceleration imparted to the actuator masses in any direction results in a unidirectional force output acting on said secondary arm. Converting the possible random directional movement of said masses into a unidirectional resultant movement is achieved by this novel mechanism, said mechanism in this case being utilized to release a cocked open safety valve. It is appreciated that said mechanism could be utilized to trigger for example, a switch or any other means that is deemed necessary to be triggered when subjected to acceleration.

Using the arrangement as disclosed above and biasing the secondary arm by an adjustable spring force makes it possible to select acceleration values said mechanism will respond to. Using the arrangement as disclosed above and selecting the ratio of the mating diameters of above said masses to their overall support distance — support distance being understood the distance between the points where before mentioned arms contact the masses will yield a definite proportion of horizontal to vertical acceleration to which said mechanism will respond to. Using the arrangement as disclosed above, and selecting the ratio of actuating mass weight to the overall friction in the system a tolerance may be determined within which the system operates.

The actuated component in the invention disclosed herein is a valve, although the invention is not limited to a valve as being the actuated component. In some prior forms of safety shut off valves the valve stem is sealed by means of a packing or some sort of elastomer to prevent external leakage. In some other prior forms of safety shut off valves, the valve stem may not be sealed, but some sort of mechanical actuator is built onto the valve, the entire structure being sealed from the outside atmosphere, said actuator having hydraulic passage, seals, brakes of frictional nature, etc. In both above mentioned cases, the safety shut function requires that stem seal friction and/or the resistance offered by hydraulic passages, relief valves, friction brakes, etc. be overcome. It is well known that seals, hydraulic fluid, means of that sort age. Aging in combination with long non operating life may result in deterioration of component mentioned before to the degree where they prevent the safe operation of the device. It is appreciated that an earthquake shut off valve, which is the subject of the present invention, may be required to operate only once in several decades, thus it may have a very long installed, but inoperative life before it is required to operate. The present invention is an improvement over the prior state of art by providing a shut off valve which on one hand has no components restricted by elastomers that are required to move during safety shut off operation, on the other hand the actuator is a frictionless mechanism having a very simple unlatching mechanism where the geometry, materials and surface finishes of the moving parts is selected so that the change in overall friction is predictably negligible in a time span of several decades.

It is, therefore, a general object of the present invention to provide a system and components thereof functioning as indicated above.

A specific object of the present invention is to provide an arrangement of this character which is extremely simple yet highly effective and accurate in monitoring acceleration imparted to the actuator.

Another specific object to the present invention is to provide an arrangement of this character in which two separate masses in combination with supporting components are used to convert acceleration in any direction imparted to the masses into a predetermined single directional force output.

Another specific object of the present invention is to provide an arrangement of this character in which by selecting a ratio of mass support distance to mass mating diameters a response output force ratio may be determined with respect to horizontal to vertical acceleration input.

Another specific object of the present invention is to provide an arrangement of this character in which by adjustably biasing the mass mechanism a g value may be selected within which the device disclosed in this invention will or will not respond.

Another specific object of the present invention is to provide a value and release mechanism where the change in frictional resistance in several decades time span is negligible thus insuring safe shut off even after several decades of inoperative installed life.

Another specific object of the present invention is to provide an arrangement of this character in which the valve, after being caused to be shut off, may be reopened externally and by doing so, the mass triggering mechanism is automatically repositioned in what could be termed its ready state condition.

Figure 2:
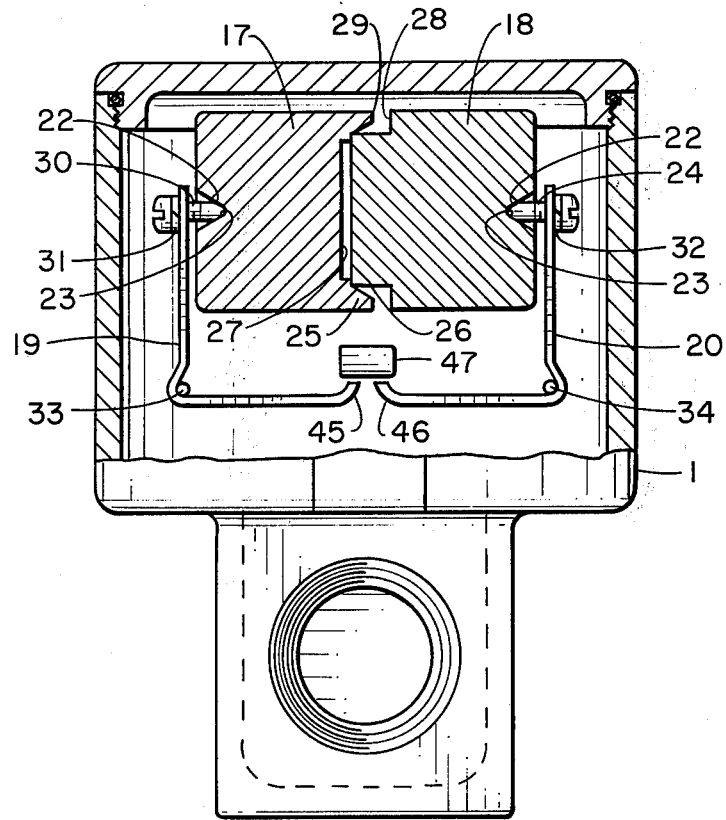
Figure 3:
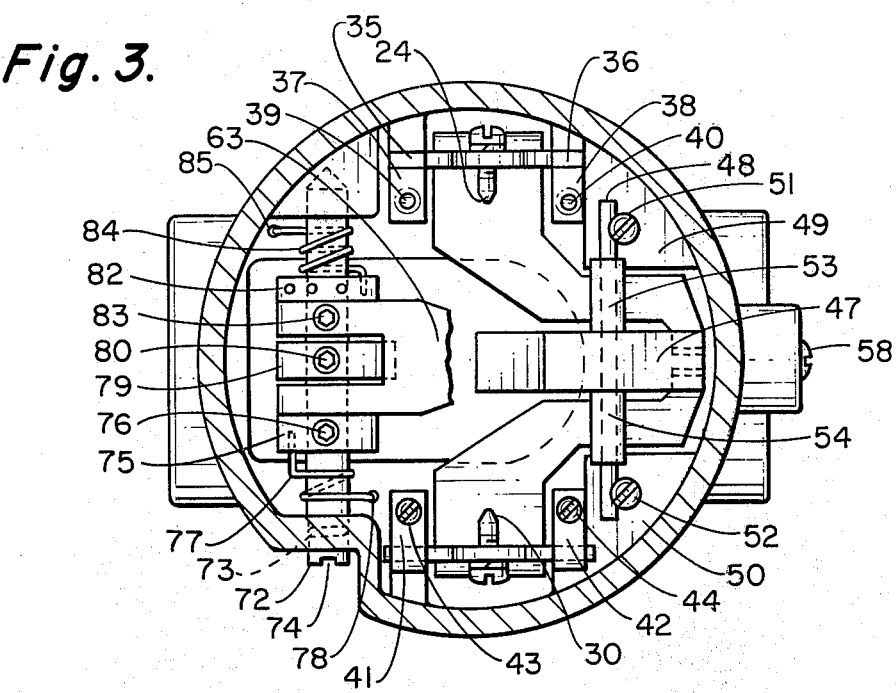

The features of the present invention which are believed to be novel, are set forth with particularity in the appended claims. This invention itself, both as to its organization and manner of operation, together with further objects and advantages thereof, may be understood by reference to the following description taken in connection with the accompanying drawings in which:

FIGS. 1-3 illustrate a practical embodiment and arrangement of the present invention, FIG. 1 being generally a view in side elevation of the secondary arm and valve closing disc mechanism inside the casing shown hatched, FIG. 2 being a view in front elevation showing what could be termed the reactance masses and their supporting arms, FIG. 3 being a top view of the primary arms and secondary arm and of the construction of their supports, also showing the spring mechanism that closes the valve.

Figure 4:
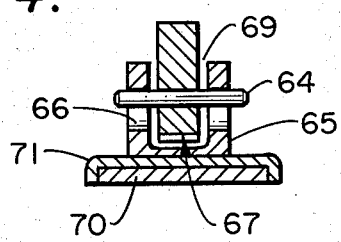

FIG. 4 is a cut away view showing the construction of the swivel seat disc arrangement.

Referring to the drawings, and particularly to FIG. 1 showing the housing 1 of the device which has a rectangular bottom portion and a cylindrical upper portion in this case as can be seen when viewing FIGS. 1 and 2. The lower portion shows the valve of the actuator and valve composite having a threaded outlet port 2 and a threaded inlet port 3 as indicated by arrow in FIG. 1. Cavity 4 is formed in the center of said lower portion of the housing to allow the seat disc assembly 5 to rotate around point 6 thus allowing the valve to be open or shut. Seating surface 7 is formed in said cavity consisting of a rounded circular seating edge 8 and an undercut 9 which allows the rounded circular seating edge 8 to take the full closing force of the seat disc assembly 5 thus insuring tight shut off of the valve. The upper portion 10 of said housing is cylindrical in external appearance, having an internal cylindrical cavity 11 that communicates with cavity 4 of the lower portion. Said upper cylindrical cavity houses all the remaining components of this device. The upper cylindrical portion 10 has rectangular, toward the outside protruding pad 12 that is used to house externally adjustable means as it will be disclosed later. Recess 13 is formed at the top of the cylindrical cavity 11, having the purpose of housing O-ring seal 14, said o-ring seal incombination with cover 15 seals the unit from outside atmosphere. The cover is a conventional screw type cover having a threaded portion 16 which is screwed into the corresponding threaded portion of said cylindrical cavity 11.

FIG. 2 illustrates what could be termed reactance masses 17 and 18 and their supporting arms 19 and 20, arranged in unique manner embodying one of the important features of this invention. It is underlined that in this invention two separate masses are used interacting with each other to monitor acceleration imparted to the device and to convert acceleration of any direction into a unidirectional output force accurately and reliably. Said reactance masses are cylindrical in appearance as shown by circle 21 of FIG. 1. This invention does not limit the outside appearance of said reactance masses 17 and 18 to a cylindrical shape, in this case it is so selected because it satisfies function, also it simplifies mathematical calculations.

Each of the reactance masses 17 and 18 have a conical indentation 22 at one end, said conical indentation having a spherical bottom 23 corresponding to the sperical end formation of the supporting stud 24 and 30 respectively. The reactance mass 17 has a conical indentation 25 at its end in contact with reactance mass 18, the minor diameter of said indentation being slightly smaller than the undercut diameter 26 of reactance mass 18. Reactance mass 17 has an additional circular indentation 27, said indentation having a smaller diameter than diameter 26 of the reactance mass 18, said indentation serving the purpose of diminishing surface area contact between reactance masses 17 and 18 in order to reduce the possibility of permanently holding said two reactance masses together by migration of material or by any other substance that may deposit on said surfaces and may act as a cement. Reactance mass 18 is provided with a shoulder 28, said shoulder being a certain distance away from tip 29 of the reactance piece 17. Said clearance is provided for the purpose of eliminating the possibility of contact between tip 29 and shoulder 28 in case the axis of said two reactance pieces become non-parallel to each other.

The two before mentioned reactance masses are brought up against each other meeting at the surface bordered by diameter 26 and held together in this position by means of supporting studs 24 and 30, said studs being screwed into arms 19 and 20 respectively by means of an external thread on the pins and an internal thread in the arms and are secured by means of lockwashers 31 and 32. Arms 19 and 20 are mounted on shafts 33 and 34 respectively, said shafts protruding a certain distance outside the width of said arms as can be seen in FIG. 1, said shafts being fastened non-rotatably to said arms by means of welding or like. Said shaft protrusions rest in grooves 35 and 36 as shown in FIG. 3, said grooves being part of pads 37 and 38, said pads being integrally formed with main housing 1, also, said pads having threaded mounting holes 39 and 40 respectively. In FIG. 3, said grooves 35 and 36, said pads 37 and 38 and said mounting holes 39 and 40 are shown for the mounting of arm 20 only, mounting pads of arm 19 are a mirror picture of the mounting pads of arm 20. Above mentioned protruding shaft ends are covered by rectangular cover plates 41 and 42 and are fastened to above mentioned pads by means of screws 43 and 44 respectively, said cover plates and said screws being shown only for arm 19, the support construction of arm 20 being identical to the support construction of arm 19. Said protruding shaft ends are free to rotate in said grooves, said arms are free to rotate between said pads.

Referring to FIG. 2, arms 19 and 20 are formed with a slightly curved tip 45 and 46 respectively, said tips being in contact with secondary arm 47. A top view of secondary arm 47 is shown in FIG. 3 and a view of side elevation of said secondary arm is shown in FIG. 1.

Referring again to FIG. 3, the secondary arm 47 is rotatably mounted on shaft 48, said shaft being located in grooves formed in pads 49 and 50 respectively, and said shaft is fastened non-rotatably into said grooves by means of screws 51 and 52 respectively, said pads being integral parts of main housing 1. The secondary arm 47 is centered between the pads 49 and 50 by means of spacer tubes 53 and 54, said spacer tubes being slid over shaft 48, allowing only slight lateral, but free rotational movement of the secondary arm 47 with respect to shaft 48.

Referring to FIG. 1, the secondary arm 47 is forced to rotate in a clockwise direction by means of bias spring 55, said bias spring having an axial concentric end configuration 56, said end being located in a hole provided in secondary arm 47. The other end of said bias spring is centrally located on support washer 57, said support washer having a larger diameter corresponding to the outside diameter of said spring, having also a smaller diameter portion corresponding to the inside diameter of said spring, this to provide adequate support and centering of said spring. Said supporting washer is rotatably mounted over the reduced diameter of adjusting screw 58, said supporting washer being forced against a shoulder formed by said reduced diameter of said adjusting screw by means of spring 55. The adjusting screw 58 is provided with an externally threaded portion and by means of said externally threaded portion, said screw is fastened into the integrally threaded portion of pad 12. Said adjusting screw is also provided with an O-ring groove where O-ring 59 is located. Pad 12 contains an enlarged hole 60, said hole being slightly larger than the major diameter of the thread of the adjusting screw 58, thus forming a smooth sealing surface for O-ring seal 59. Finally, said adjusting screw 58 is provided with a screw driver slot 61 at its outer end.

Still referring to FIG. 1, a latching surface 62 is formed at the lower end of secondary arm 47, said latching surface being in contact with the similarly formed latching surface of the seat disc arm 63. Seat disc assembly 5 is mounted onto seat disc arm 63 by means of pin 64, shown in FIG. 4, said pin being pressed into a hole provided in said seat disc arm 63. Referring to FIG. 4 again, seat disc swivel 65 is loosely retained by pin 64, clearance 66 between said pin and the lower end of the elongated hole in said seat disc swivel being larger than clearance 67, the purpose of this arrangement is to absorb the impact loading seen at the closing of the valve by closing clearance 67, rather than absorbing said impact by pin 64. Pad 68 is formed on seat disc arm 63 to relieve pin 64 from above impact loading, an additional purpose of said pad being to center the valve closing force on seat disc assembly 5 thus insuring uniform seating force between said seat disc assembly and the seating surface 7. Clearance 69 provided between said seat disc arm and the inside surface of said seat disc swivel, said clearance in combination with clearances 66 and 67 provide the seat disc assembly 5 with a controlled freedom of movement, thus allowing proper self alignment at seating surface 7. Seat disc swivel 65 is fastened via welding or other suitable means to seat disc holder 71, a soft seat disc 70 is cemented to said seat disc holder.

Referring to FIG. 3, seat disc arm 63 is partially shown, said arm being mounted on shaft 72 in a manner that said arm is free to rotate on said shaft, said shaft being supported by a bore provided in housing 1, said shaft being provided with a groove to house O-ring seal 73, said O-ring having the purpose to seal the inside cavity of said housing from the outside atmosphere around said shaft. Also, a screw driver slot 74 is provided at the outer end of said shaft for purposes explained later.

Collar 75 is fastened to shaft 72 by means of set screw 76, a hole being provided in said collar to hold one end of spring 77, other end of said spring being located in hole 78, said hole being provided in main housing 1. Also, block 79 is mounted on shaft 72 and is fastened to said shaft by means of set screw 80.

Referring to FIG. 1, block 79 is shown with its larger dimension being in a vertical position and with its lower left corner leaning against shoulder 81 provided in main housing 1, said block being biased in clockwise direction. Referring back to FIG. 3, said biasing is achieved by means of spring 77, said spring acting on collar 75, transmitted by means of set screw 76 to shaft 72, further transmitted by said shaft and set screw 80 to block 79. Rotating said block by means of screw driver slot 74 of shaft 72 in a counterclockwise direction, said block will contact the bottom surface of the seat disc arm 63, and further counterclockwise rotation of said block will cause said seat disc arm to rotate with said block. It is appreciated that said block serves the purpose to open the valve from its closed position. After removing the external force that caused the valve to become open, block 79 is forced away from the bottom surface of the seat disc arm 63 by means explained before, this arrangement serving the purpose of allowing the valve to close freely without being restricted by the sticktional and frictional resistance of the o-ring seal 73, said sticktion possibly being very large due to migration of materials during a long installed but inoperational life of said device.

Referring to FIG. 3, sleeve 82 is located on shaft 72, said sleeve being free to rotate on said shaft, said sleeve having a smaller diameter, said smaller diameter being introduced into a corresponding diameter provided in seat disc arm 63, said sleeve being fastened to said seat disc arm by means of set screw 83 acting on said smaller diameter. Said sleeve having a larger diameter portion, said portion being provided with several radial holes to be used for the insertion of assembly tools into said holes during assembly, said larger diameter portion of said sleeve having an axial hole located close to its outer circumference, said axial hole is being provided to locate one end of the torsion spring 84, the other end of said torsion spring being located in hole 85, said hole being provided in main housing 1. Torsion spring 84 is wound in such a manner that it forces seat disc arm 63 to rotate in a clockwise direction as viewed on FIG. 1 and is doing so by means of sleeve 82 and set screw 83. It is appreciated that said spring force is provided for the purpose of causing the valve to close and for the purpose of holding seat disc assembly 5 tight against seat surface 7 after said valve is being closed.

Referring to FIGS. 1 thru 3, it will be appreciated that this device is completely enclosed and that the only communication with the external atmosphere is thru the inlet port 3 and thru the outlet port 2.

Referring to the operation of this system, it should be pointed out that FIG. 2 shows the reactance masses 17 and 18 and their supporting arms 19 and 20 respectively in their what could be termed basic position, a position said components assume when the device is first installed, i.e. the device is ready to operate when subjected to acceleration. In this position, the surfaces of the reactance masses bordered by diameter 26 are held together, at the same time tips 45 and 46 of the arms 19 and 20 respectively are being forced against the bottom surface of secondary arm 47. If FIG. 2 is considered to be a front elevation, the reactance masses tend to separate due to gravity at the lower end of their mating surfaces bordered by diameter 26 while maintaining contact at the top edge of said surfaces, thus forcing arms 19 and 20 apart, thus exerting a certain force against secondary arm 47. If, on the other hand, FIG. 2 is considered to be a top view, the reactance masses tend to separate at their far end of the mating surfaces, while maintaining contact at that end of the mating surfaces that is closer to the viewing eye, again exerting a force against the secondary arm 47. It can be proven mathematically that the force exerted against the secondary arm 47, will be the same in both cases if the mating surfaces of said masses are circular, meaning that said surfaces are bordered by a constant radius. Also, it can be proven that, if the mating surfaces are bordered, for example by an elipsis, the force seen by the secondary arm 47, will be greater when the reactance masses separate the farthest at the end point of a minor axis of the ellipsis as opposed to when they separate at the end point of a major axis of the ellipsis, in this latter case the secondary arm 47 would see less force.

For further understanding of the operation of this system, let us consider that the mating surfaces of said reactance masses are bordered by a constant radius and having said constant radius configuration the device is placed in such a position that the axis of the cylindrical reactance masses are vertical. Now, by selecting the sum of the weights of the reactance masses plus the unbalanced weight of the arms to be a certain value, it is possible to arrive at the same reaction force against secondary arm 47 as in the previous two cases. It can be clearly seen that by adapting geometry and by selecting the weight of the reactance masses as said above, an identical force will be produced acting against secondary arm 47 when the device is subjected to an acceleration of a certain g value regardless along which axis said acceleration occurs.

Again, let us consider that the device is located such that the axis of the reactance masses are in a vertical postion, also, the mating surfaces of said masses are circular. It can be proven that by simply changing the ratio of mass support distance to the diameter of mass mating surfaces, that is by departing from the parameters set forth in previous paragraph, the force reaction produced against secondary arm 47 will be different when the device is subjected to vertical acceleration then the force reaction produced when the device is subjected to a horizontal acceleration. Incorporating different parameters is a very important feature of this invention, since the expected acceleration values during an earthquake are not identical in $g$ value along all axis.

Referring to FIG. 1, arms 19 and 20 are restricted in their movement by the geometry of the cavity 11 so that the mating surfaces of the reactance masses are allowed to separate only to degree within which the device operates reliably, accurately and can be repositioned externally.

Referring further to FIG. 1, the force exerted against the secondary arm 47 resulting from acceleration forced upon the reactance masses tends to rotate said secondary arm in a counterclockwise direction against spring 55 and against friction represented by the latching surfaces 62. If and when said resistances are overcome, seat disc arm 63 becomes unlatched, said arm being forced to rotate in a clockwise direction by means of torsion spring 84, thus closing the valve component of this composite and keeping said valve in a closed position until said valve is caused to reopen by means of an externally applied force.

Latching surfaces 62 are very carefully designed as far as geometry, material and finish in order to provide on one hand for a contact of very low friction, on the other hand for a pair of mating surfaces that will not show an appreciably increased sticktion between said sufaces even after being in contact with each other without any motion with reference to each other for a time span of several decades. A low friction between said surfaces is desirable, since as the overall composite friction of the device increases, the minimum g value of acceleration increases within which the device will not respond. This device, constructed in the approximate size represented by the attached drawings, will have a threshold value of 0.2 g within which the device will not reliably respond. It should be noted, that a 0.2 g value is lower than any known equipment of this character is required to respond within.

Referring to FIG. 1, spring 55 is provided firstly to balance the forces seen by the secondary arm 47, said forces being created by the weight of the reactance masses, secondly to set a threshold value of the acceleration force within which the unit is not required to respond, said setting being accomplished by turning screw 58 in a clockwise direction to increase the threshold value and by turning said screw in a counterclockwise direction to decrease the threshold value of acceleration. This unit may be adjusted for said threshold values in the range of from 0.2 g to approximately 25.0 g.

Referring to FIG. 3, the reopening of the valve is accomplished by turning shaft 72, in a counterclockwise direction by means of a screw driver, causing block 79, to force seat disc arm to turn in the same direction, continuing this motion and referring to FIG. 1, surface 86 of said seat disc arm contacts boss 87 provided on secondary arm 47. Forcing said seat disc armm to rotate further in said counterclockwise direction, secondary arm 47 is forced to rotate in a clockwise direction and by doing so said secondary arm exerts a force upon the tips of the mass support arms 19 and 20 causing said arms to bring the reactance masses 17 and 18 in a position where their surfaces bordered by diameter 21 (shown in FIG. 2) completely mate. Removing the force that causes seat disc arm 63 to turn in a counterclockwise direction, said arm is urged to rotate clockwise and is urged to do so by means of spring 84 (shown in FIG. 3), said arm will continue its clockwise rotation until latching surfaces 62 meet and prevent said arm from any further rotation in said clockwise direction. At this point adaquate clearance is created between surface 86 of the seat disc arm 63 and boss 87 of the secondary arm 47, allowing said secondary arm to move freely in a counterclockwise direction upon being forced to do so due to acceleration imparted to the reactance masses. At this point the reopening of the valve and the repositioning of the actuator is completed and the device is ready for the next operation upon being subjected to acceleration above the threshold value set by adjusting screw 68.

While the particular embodiments of the present invention have been shown and described, it will be obvious to those skilled in the art that changes and modifications may be made without departing from this invention in its broader aspected and, therefore, the aim in the appended claims is to cover all such changes and modifications as fall within the true spirit and scope of this invention.

I claim:

1. An acceleration responsive device comprising:
a housing;
a pair of elongated reactant masses, each said mass having a front and a back end, each said mass having a longitudinal axis extending through the center of gravity of the mass from said front end to said back end, said masses being loosely interlocked together with the front ends of said masses normally assuming an abutting relationship defining an inline interlocked first position but movable to a misaligned interlocked second position, said first position being with said longitudinal axes in alignment and located substantially horizontal;
supporting means for supporting said reactant masses, said supporting means mounted on said housing, said supporting means contacting each said mass on its respective said longitudinal axis, whereby the movement from said first position to said second position is substantially a rolling motion between said masses to thereby minimize the producing of friction in the movement, the rolling motion being produced due to point contact between said masses immediately upon said masses leaving said interlocked first position;

a latching means mounted upon said housing, said supporting means connectable to cause activation of said latching means when said reactant masses are in said second position; and actuation means mounted on said housing, said latching means connectable to hold said actuation means in an inactive position, upon activation of said latching means said actuation means assumes an active position.

2. The device as defined in claim 1 wherein:

the interlocking together of said pair of rectant masses being in a circle.

3. The device as defined in claim 1 including:

first biasing means connected to said latching means, said first biasing means exerting a continuous bias upon said latching means to retard activation thereof, said biasing means capable of being adjusted to regulate the amount of force required to effect activation of said latching means.

4. The device as defined in claim 1 wherein:

said latching means comprising an arm being pivotally mounted with respect to said housing, said arm including a boss thereon, said boss to connect with said actuation means during return movement of said actuation means from said active position to said inactive position with such connection reestablishing the initial position of said latching means.

5. The device as defined in claim 1 wherein:

said actuation means cmrises an arm being pivotally mounted with respect to said housing, said arm being continuously biased toward said active position.

6. An acceleration responsivve device comprising:

a housing;

a pair of reactant masses, said masses being loosely interlocked together, said masses normally assuming an inline interlocked first position but movable to a misaligned interlocked second position;

supporting means for supporting said reactant masses, said supporting means mounted on said housing;

a latching means mounted upon said housing, said supporting means connectable to cause activation of said latching means when said reactant masses are in said second position;

actuation means mounted on said housing, said latching means connectable to hold said actuation means in an inactive position, upon activation of said latching means said actuation means assumes an active position; and said supporting means comprising a pair of pivotally mounted supporting arms located in a mirror image relationship at opposite ends of said interlocked reactant masses.

7. An acceleration responsive device comprising:

a housing;

a pair of reactant masses, said masses being loosely interlocked together, said masses normally assuming an inline interlocked first position but movable to a misaligned interlocked section position;

supporting means for supporting said reactant masses, said supporting means mounted on said housing;

a latching means mounted upon said housing, said supporting means connectable to cause activation of said latching means when said reactant masses are in said second position;

actuation means mounted on said housing, said latching means connectable to hold said actuation means in an inactive position, upon activation of said latching means said actuation means assumes an active position; and said actuation means comprises a movable member, said movable member including a seat structure, said seat structure being movably mounted upon said movale member with said actuation means in said active position, said seat functions to close a fluid conduit.

8. The device as defined in claim 7 wherein:

said seat being constructed of a soft material so as to form a fluid tight contact around said conduit to prevent leakage of fluid therethrough.

9. The device as defined in claim 7 wherein:

first biasing means connected to said latching means, said first biasing means exerting a continuous bias upon said latching means to retard activation thereof, said biasing means capable of being adjusted to regulate the amount of force required to effect activation of said latching means.

10. The device as defined in claim 9 wherein:

said latching means comprising an arm being pivotally mounted with respect to said housing, said arm including a boss thereon, said boss to connect with said actuation means during return movement of said actuation means from said active position to said inactive position with such connection reestablishing the initial position of said latching means.

11. The device as defined in claim 10 wherein:

the interlocking together of said pair of reactant masses being in a circle.

12. The device as defined in claim 11 wherein:

said supporting means comprising a pair of pivotally mounted supporting arms located in a mirror image relationship at opposite ends of said interlocked reactant masses.

* * * * *